United States Patent
Fattal

(10) Patent No.: US 12,164,119 B2
(45) Date of Patent: Dec. 10, 2024

(54) MULTIVIEW DISPLAY AND METHOD

(71) Applicant: LEIA INC., Menlo Park, CA (US)

(72) Inventor: David A. Fattal, Menlo Park, CA (US)

(73) Assignee: LEIA INC., Menlo Park, CA (US)

(*) Notice: Subject to any disclaimer, the term of this patent is extended or adjusted under 35 U.S.C. 154(b) by 776 days.

(21) Appl. No.: 17/246,688

(22) Filed: May 2, 2021

(65) Prior Publication Data

US 2021/0255476 A1    Aug. 19, 2021

Related U.S. Application Data

(63) Continuation of application No. PCT/US2018/059279, filed on Nov. 5, 2018.

(51) Int. Cl.
*G02B 30/33* (2020.01)
*F21V 8/00* (2006.01)
*G02B 5/20* (2006.01)

(52) U.S. Cl.
CPC ............. *G02B 30/33* (2020.01); *G02B 5/201* (2013.01); *G02B 6/0036* (2013.01)

(58) Field of Classification Search
CPC ...... G02B 30/33; G02B 5/201; G02B 6/0036; H04N 13/324; H04N 13/351; H04N 13/32; G09G 5/14; G09G 5/02
See application file for complete search history.

(56) References Cited

U.S. PATENT DOCUMENTS

| | | |
|---|---|---|
| 7,990,498 B2 | 8/2011 | Hong |
| 8,149,272 B2 | 4/2012 | Evans et al. |
| (Continued) | | |

FOREIGN PATENT DOCUMENTS

| | | |
|---|---|---|
| CA | 3007486 | 8/2017 |
| CA | 3021958 | 11/2017 |
| (Continued) | | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
(Continued)

*Primary Examiner* — Mustak Choudhury
*Assistant Examiner* — K Muhammad
(74) *Attorney, Agent, or Firm* — Schwegman Lundberg & Woessner, P.A.

(57) ABSTRACT

A multiview display and a method of multiview display operation employ an array of light valves having a repeating plurality of color sub-pixels and an array of multibeam emitters providing directional light beams. The array of light valves having the repeating plurality of color sub-pixels is configured to modulate the directional light beams as color pixels of views of a multiview image. A first multibeam emitter and a second multibeam emitter of the multibeam emitter array are offset from one another with respect to the array of light valves. The offset is configured to direct to a color pixel of the multiview image a modulated directional light beam from each of the first multibeam emitter and the second multibeam emitter having an equivalent angular direction relative to one another. The equivalent angular direction may mitigate color fringing within the color pixel.

7 Claims, 6 Drawing Sheets

(56) References Cited

U.S. PATENT DOCUMENTS

| | | | |
|---|---|---|---|
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,345,505 | B2 | 7/2019 | Fattal |
| 10,551,546 | B2 | 2/2020 | Fattal |
| 10,649,128 | B2 | 5/2020 | Fattal et al. |
| 10,798,371 | B2 | 10/2020 | Fattal |
| 10,802,212 | B2 | 10/2020 | Fattal |
| 10,810,917 | B2 | 10/2020 | Fattal |
| 10,830,939 | B2 | 11/2020 | Fattal et al. |
| 10,838,134 | B2 | 11/2020 | Fattal et al. |
| 10,884,175 | B2 | 1/2021 | Fattal |
| 10,928,677 | B2 | 2/2021 | Aieta et al. |
| 2005/0083246 | A1 | 4/2005 | Saishu et al. |
| 2009/0322986 | A1 | 12/2009 | Wei et al. |
| 2012/0200807 | A1 | 8/2012 | Wei et al. |
| 2013/0169518 | A1 | 7/2013 | Wu et al. |
| 2017/0070728 | A1 | 3/2017 | Kim et al. |
| 2017/0184776 | A1 | 6/2017 | El-Ghoroury et al. |
| 2017/0363794 | A1 | 12/2017 | Wan et al. |
| 2018/0011237 | A1 | 1/2018 | Fattal |
| 2018/0188691 | A1 | 7/2018 | Fattal |
| 2018/0196194 | A1 | 7/2018 | Fattal |
| 2018/0278923 | A1 | 9/2018 | Fattal |
| 2018/0299608 | A1 | 10/2018 | Fattal et al. |
| 2018/0306965 | A1 | 10/2018 | Fattal |
| 2019/0302336 | A1 | 10/2019 | Fattal et al. |
| 2020/0033621 | A1 | 1/2020 | Fattal et al. |

FOREIGN PATENT DOCUMENTS

| | | | |
|---|---|---|---|
| CA | 2997564 | | 12/2017 |
| CA | 3116008 | | 5/2020 |
| CN | 1619358 | | 5/2005 |
| CN | 103185968 | | 7/2013 |
| CN | 107209393 | | 9/2017 |
| CN | 107923600 | | 4/2018 |
| CN | 112997244 | | 6/2021 |
| EP | 3877970 | | 9/2021 |
| JP | 2007087647 | A | 4/2007 |
| JP | 2018503877 | | 2/2018 |
| JP | 2018055079 | A | 4/2018 |
| JP | 2022512856 | | 2/2022 |
| JP | 7311592 | | 7/2023 |
| KR | 20090037964 | A | 4/2009 |
| KR | 20100038854 | A | 4/2010 |
| KR | 20170105490 | | 9/2017 |
| KR | 20180039050 | | 4/2018 |
| KR | 20180101357 | | 9/2018 |
| KR | 20190000887 | | 1/2019 |
| KR | 20210073598 | | 6/2021 |
| TW | 201213983 | | 4/2012 |
| TW | 201743092 | | 12/2017 |
| TW | 202022436 | | 6/2020 |
| TW | I818092 | | 10/2023 |
| WO | 2012038856 | A1 | 3/2012 |
| WO | 2016122679 | | 8/2016 |
| WO | WO-2016122679 | A1 * | 8/2016 ......... G02B 27/2214 |
| WO | WO-2017041079 | A1 * | 3/2017 ......... G02B 27/2271 |
| WO | 2017128753 | | 8/2017 |
| WO | 2017213676 | | 12/2017 |
| WO | 2018125103 | A1 | 7/2018 |
| WO | 2020096566 | | 5/2020 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

International Search Report and Written Opinion (ISRWO) by International Searching Authority (ISA) Korean Intellectual Property Office (KIPO) dated Aug. 5, 2019 (12 pages) for foreign counterpart PCT Application No. PCT/US2018/059279.

"Korean Application Serial No. 10-2021-7016830, Notice of Preliminary Rejection mailed Jan. 31, 2024", w English Translation, 6 pgs.

"Korean Application Serial No. 10-2021-7016830, Office Action mailed Aug. 3, 2022", w English Translation, 27 pgs.

"Korean Application Serial No. 10-2021-7016830, Office Action mailed May 30, 2023", w English Translation, 14 pgs.

"International Application Serial No. PCT US2018 059279, International Preliminary Report on Patentability mailed May 20, 2021", 8 pgs.

"Korean Application Serial No. 10-2021-7016830, Response filed Mar. 14, 2024 to Notice of Preliminary Rejection mailed Jan. 31, 2024", w English Claims, 12 pgs.

"Korean Application Serial No. 10-2021-7016830, Response filed Sep. 6, 2023 to Office Action mailed May 30, 2023", w English Translation, 16 pgs.

"Korean Application Serial No. 10-2021-7016830, Response filed Oct. 24, 2022 to Office Action mailed Aug. 3, 2022", w English Translation, 29 pgs.

"Chinese Application Serial No. 201880099166.X, Office Action mailed Sep. 22, 2023", w English Translation, 28 pgs.

"European Application Serial No. 18939540.3, Communication Pursuant to Article 94(3) EPC mailed May 6, 2024", 5 pgs.

"European Application Serial No. 18939540.3, Extended European Search Report mailed May 23, 2022", 11 pgs.

"Chinese Application Serial No. 201880099166.X, Office Action mailed Mar. 16, 2024", w English Translation, 24 pgs.

"Canadian Application Serial No. 3, 116,008, Office Action mailed May 11, 2022", 3 pgs.

"Canadian Application Serial No. 3,116,008, Office Action mailed Feb. 21, 2023", 3 pgs.

"Canadian Application Serial No. 3,116,008, Office Action mailed Oct. 3, 2023", 5 pgs.

"European Application Serial No. 18939540.3, Response to Communication pursuant to Rules 161(2) and 162 EPC filed Dec. 15, 2021", 21 pgs.

"European Application Serial No. 18939540.3, Response filed Nov. 29, 2022 to Extended European Search Report mailed May 23, 2022", 19 pgs.

"Chinese Application Serial No. 201880099166.X, Response filed Jan. 22, 2024 to Office Action mailed Sep. 22, 2023", w English Claims, 9 pgs.

"Chinese Application Serial No. 201880099166.X, Response filed May 14, 2024 to Office Action mailed Mar. 16, 2024", w English Claims, 35 pgs.

"Canadian Application Serial No. 3,116,008, Response filed Mar. 24, 2023 to Office Action mailed Feb. 21, 2023", 7 pgs.

"Canadian Application Serial No. 3,116,008, Voluntary Amendment filed Apr. 9, 2021", 38 pgs.

(56) References Cited

OTHER PUBLICATIONS

"Taiwanese Application Serial No. 108135503, Office Action mailed Jul. 29, 2020", W English Translation, 19 pgs.

"Taiwanese Application Serial No. 108135503, Response filed Oct. 29, 2020 to Office Action mailed Jul. 29, 2020", w English Translation, 46 pgs.

"Taiwanese Application Serial No. 108135503, Decision Of Rejection mailed Jan. 29, 2021", W English Translation, 8 pgs.

"Taiwanese Application Serial No. 108135503, Response filed Mar. 30, 2021 to Decision Of Rejection mailed Jan. 29, 2021", W English translation, 40 pgs.

"Canadian Application Serial No. 3,116,008, Response filed Jan. 17, 2024 to Office Action mailed Oct. 3, 2023", 12 pgs.

"Canadian Application Serial No. 3,116,008, Response filed Sep. 9, 2022 to Office Action mailed May 11, 2022", 37 pgs.

"Taiwanese Application Serial No. 108135503, Office Action mailed Feb. 6, 2023", W English Translation, 6 pgs.

"Taiwanese Application Serial No. 108135503, Response filed May 8, 2023 to Office Action mailed Feb. 6, 2023", W English translation, 112 pgs.

"Japanese Application Serial No. 2021-523379, Notification of Reasons for Rejection mailed Jun. 29, 2022", W English Translation, 6 pgs.

"Japanese Application Serial No. 2021-523379, Examiners Decision of Final Refusal mailed Dec. 28, 2022", W English Translation, 4 pgs.

"Japanese Application Serial No. 2021-523379, Response filed May 16, 2023 to Notification of Reasons for Rejection mailed Jun. 29, 2022", W English Claims, 32 pgs.

\* cited by examiner

MULTIVIEW DISPLAY AND METHOD

CROSS-REFERENCE TO RELATED APPLICATIONS

This patent application is a continuation application of and claims the benefit of priority to International patent application No. PCT/US2018/059279, filed Nov. 5, 2018, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various other displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing an array of multibeam emitters offset from one another with application to electronic displays. In various embodiments consistent with the principles herein, a multiview display is provided. The multiview display comprises an array of light valves having a repeating plurality of color sub-pixels. The display further comprises an array of multibeam emitters configured to provide directional light beams to the array of light valves. The multibeam emitters of the multibeam emitter array are offset from one another with respect to the light valve array. The offset may mitigate color fringing in the multiview image, according to some embodiments and examples.

Herein a 'two-dimensional display' or '2D display' is defined as a display configured to provide a view of an image that is substantially the same regardless of a direction from which the image is viewed (i.e., within a predefined viewing angle or viewing range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three-dimensional image (3D image).

Figure 1A:
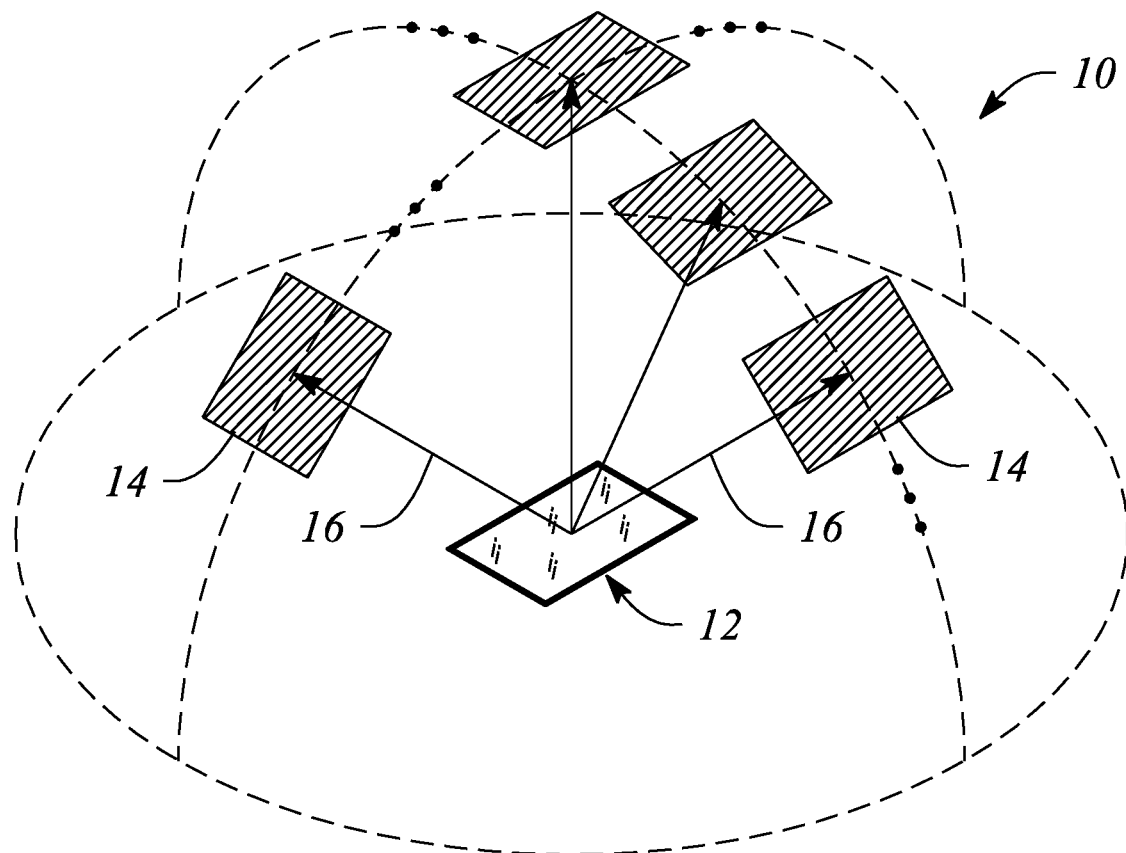
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\varphi$ is an angle in a horizontal plane (e.g., parallel to the multiview display screen plane).

Figure 1B:
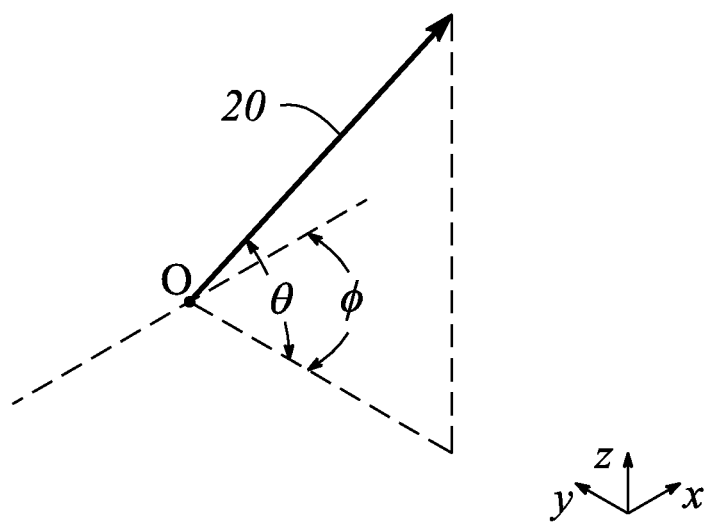
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each of a similar plurality of different views of a multiview display. In particular, a multiview pixel may have an individual pixel or set of pixels corresponding to or representing a view pixel in each of the different views of the multiview image. By definition herein therefore, a 'view pixel' is a pixel or set of pixels corresponding to a view in a multiview pixel of a multiview display. In some embodiments, a view pixel may include one or more color sub-pixels. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels a multiview pixel may have equivalent or at least substantially similar locations or coordinates in each of the different views. For example, a first multiview pixel may have individual view pixels located at $\{x1, y1\}$ in each of the different views of a multiview image, while a second multiview pixel may have individual view pixels located at $\{x2, y2\}$ in each of the different views, and so on.

In some embodiments, a number of view pixels in a multiview pixel may be equal to a number of views of the multiview display. For example, the multiview pixel may provide sixty-four (64) view pixels associated with a multiview display having 64 different views. In another example, the multiview display may provide an eight by four array of views (i.e., 32 views) and the multiview pixel may include thirty-two 32 view pixels (i.e., one for each view). Additionally, each different view pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of view pixels (i.e., pixels that make up a selected view) in the multiview display views each view of the multiview display. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

By definition herein, a 'multibeam emitter' is a structure or element of a backlight or a display that produces light that includes a plurality of light beams. In some embodiments, the multibeam emitter may be optically coupled to a light guide of a backlight to provide the light beams by coupling out a portion of light guided in the light guide. In such embodiments, a multibeam emitter may comprise a 'multibeam element.' In other embodiments, the multibeam emitter may generate light emitted as the light beams (i.e., may comprise a light source). Further, the light beams of the plurality of light beams produced by a multibeam emitter have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam emitter. In some embodiments, the multibeam emitter may be considered an 'extended point light source', i.e., a plurality of point light sources distributed across an extent of the multibeam emitter, by definition herein. Further, a light beam produced by the multibeam emitter has a principal angular direction given by angular components $\{\theta, \phi\}$, by definition herein, and as described above with respect to FIG. 1B.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a color sub-pixel' means one or more color sub-pixels and as such, 'the color sub-pixel' means 'color sub-pixel(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
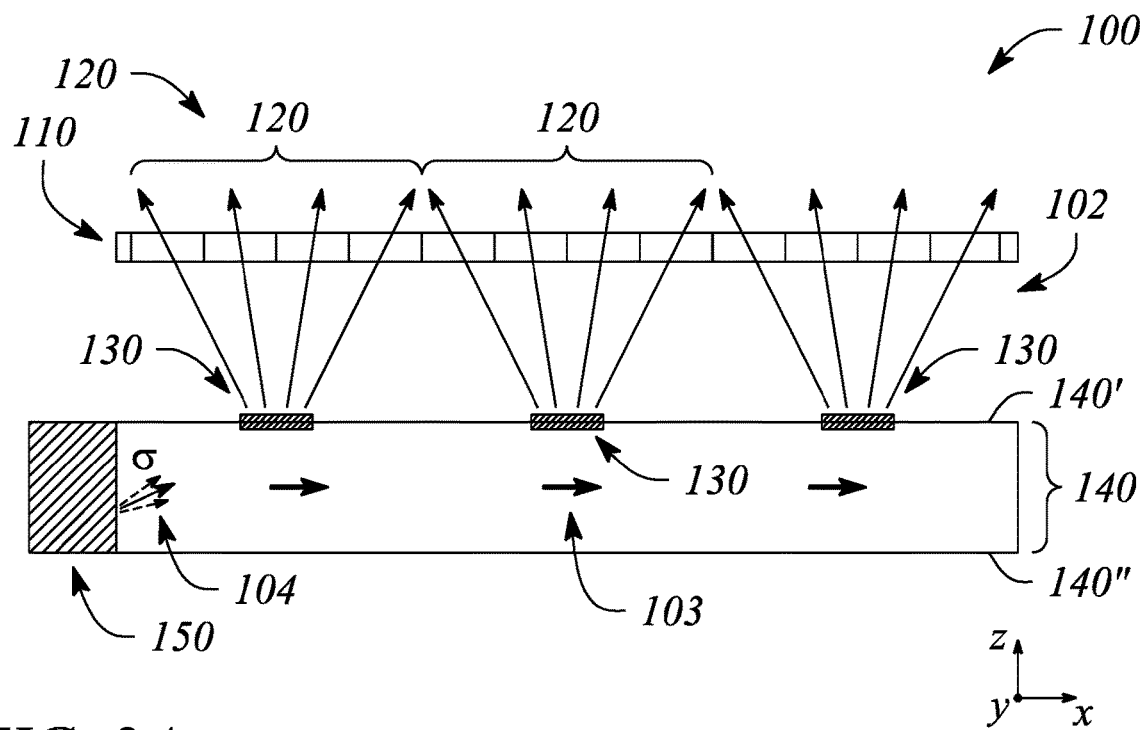
FIG. 2A illustrates a cross-sectional view of a multiview display in an example, according to an embodiment consistent with the principles described herein.
Figure 2B:
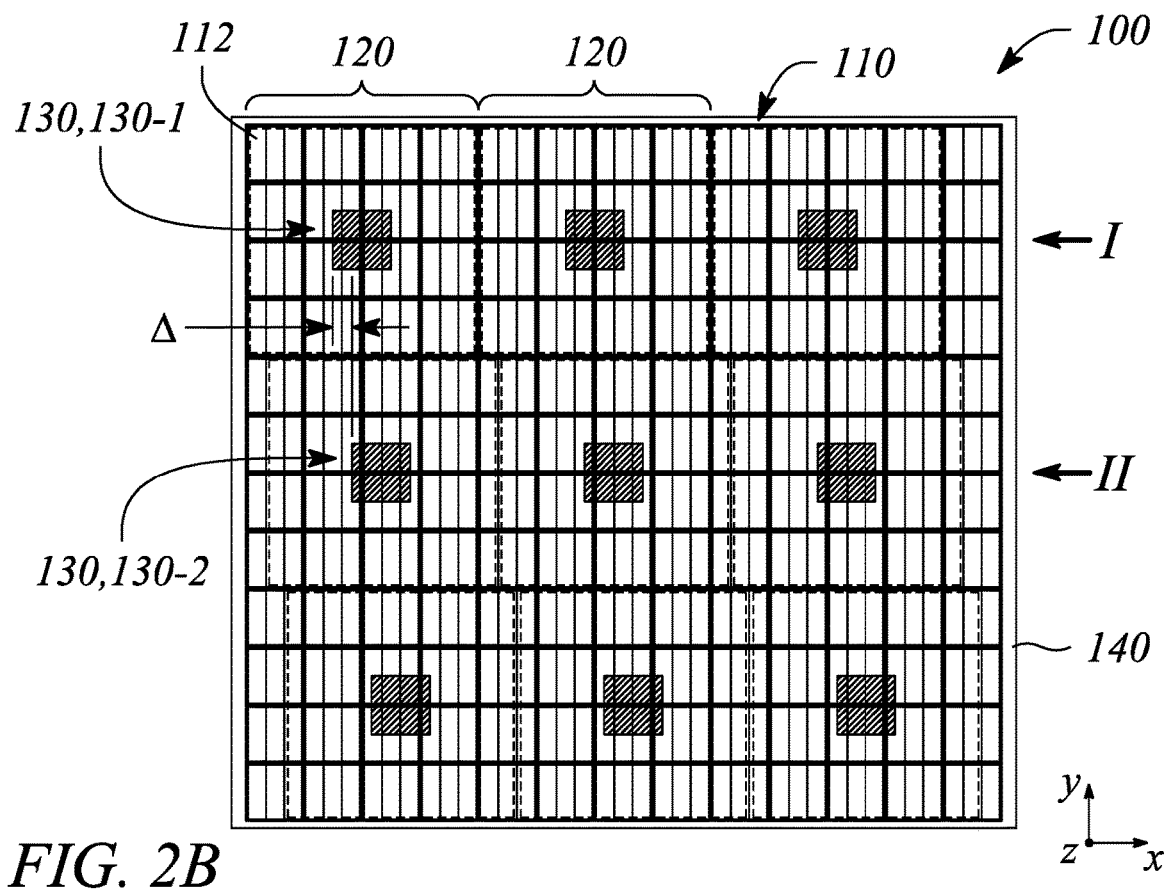
FIG. 2B illustrates a plan view of a multiview display in an example, according to an embodiment consistent with the principles described herein.
Figure 2C:
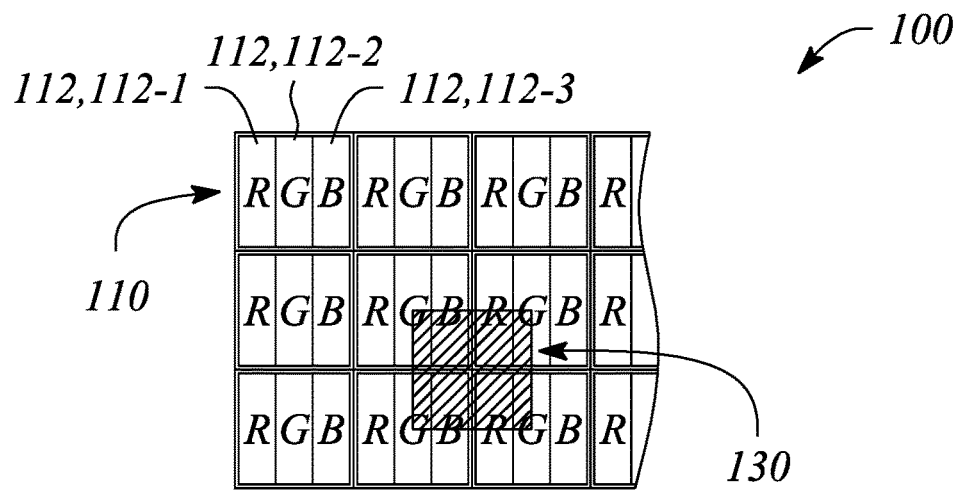
FIG. 2C illustrates a plan view of a portion of the multiview display of FIG. 2B in an example, according to an embodiment consistent with the principles described herein.

According to some embodiments of the principles described herein, a multiview display is provided. FIG. 2A illustrates a cross-sectional view of a multiview display 100 in an example, according to an embodiment consistent with the principles described herein. FIG. 2B illustrates a plan view of the multiview display 100 in an example, according to an embodiment consistent with the principles described herein. FIG. 2C illustrates a plan view of a portion of the multiview display 100 of FIG. 2B in an example, according to an embodiment consistent with the principles described herein. According to various embodiments, the multiview display 100 illustrated in FIGS. 2A-2C may mitigate color fringing in or associated with a multiview image displayed by or on the multiview display 100.

The multiview display 100 illustrated in FIGS. 2A-2C comprises an array of light valves 110. FIGS. 2A and 2B also illustrate light valves 110 of the light valve array arranged as a plurality of multiview pixels 120, outlined by dashed lines in FIG. 2B. According to various embodiments, the light valve array may comprise any of a variety of different types of light valves including, but not limited to, a liquid crystal light valve, an electrophoretic light valve, and a light valve based on electrowetting.

As illustrated in FIGS. 2B and 2C, the array of light valves 110 comprises a repeating plurality of color sub-pixels 112 configured to modulate directional light beams as color pixels of different views of a multiview image displayed on or by the multiview display 100. In particular, each light valve 110 of the light valve array includes the plurality of color sub-pixels 112. As such, across the light valve array the plurality of color sub-pixels 112 repeats from one light valve 110 to an adjacent light valve 110 as the repeating color sub-pixel plurality.

In some embodiments, as illustrated in FIG. 2C, a light valve 110 of the array of light valves 110 may comprise the plurality of color sub-pixels 112 having a first color sub-pixel 112-1, a second color sub-pixel 112-2, and a third color sub-pixel 112-3. Further, as illustrated in FIG. 2C, the plurality of color sub-pixels 112 may be the same in each light valve 110 of the light valve array. As a result, the color sub-pixel plurality having the first, second, and third color sub-pixels 112-1, 112-2, 112-3 may repeat across the light valve array (e.g., in a row direction), according to various embodiments.

In some embodiments, a color sub-pixel 112 of the repeating color sub-pixel plurality may have or represent a different color from another color sub-pixel of the repeating color sub-pixel plurality (e.g., each color sub-pixel 112 may include a different color filter representing a different color). For example, the first color sub-pixel 112-1 may be a red color sub-pixel (R), the second color sub-pixel 112-2 may be a green color sub-pixel (G), and the third color sub-pixel 112-3 may be a blue color sub-pixel (B), e.g., as illustrated in FIG. 2C. Since the color sub-pixel plurality repeats along a row of the array of light valves 110, the repeating color sub-pixel plurality comprises a repeating set of red (R), green (G), and blue (B) color sub-pixels 112, as illustrated in FIG. 2C by way of example and not limitation. The repeating set of red (R), green (G), and blue (B) color sub-pixels 112 may be consistent with a red-green-blue (RGB) color model used to display color multiview images with the multiview display 100, according to some embodiments. In other non-limiting examples and embodiments (not illustrated), the repeating plurality of color sub-pixels 112 may include, but is not limited to, a repeating set that includes red, green, blue, and yellow color sub-pixels 112 and a repeating set that includes red, green, blue, and white color sub-pixels 112.

Referring again specifically to FIGS. 2A and 2B, the illustrated multiview display 100 further comprises an array of multibeam emitters 130. The multibeam emitters 130 are configured to provide the directional light beams 102 modulated by the plurality of color sub-pixels 112 of the light valve array. The directional light beams 102 may have principal angular directions corresponding to respective view directions of different views of the multiview display 100 or equivalently of different views of the multiview image displayed on or by the multiview display 100. In particular, FIG. 2A illustrates the directional light beams 102 as a plurality of diverging arrows depicted as being directed way from the multibeam emitters 130 in a direction toward the light valve array.

According to various embodiments, a first multibeam emitter 130-1 and a second multibeam emitter 130-2 of the array of multibeam emitters 130 are offset from one another with respect to the light valve array. In particular, the first multibeam emitter 130-1 and the second multibeam emitter 130-2 may be offset from one another with respect to the light valve array in the row direction by an offset distance Δ. In other embodiments, the multibeam emitters may be offset in the column direction, e.g., where the offset may also be the offset distance Δ. According to some embodiments, the offset distance Δ may be equal to or substantially equal to a width a color sub-pixel 112. The color sub-pixel width may be in a row direction of the array of light valves 110, as illustrated in FIG. 2B, for example.

In some embodiments, such as in FIGS. 2B, the first multibeam emitter 130-1 may be a member of a first row I of the multibeam emitter array and the second multibeam emitter 130-2 may be a member of a second row II of the multibeam emitter array. Further, the second row II of the multibeam emitter array may be offset from the first row I of the multibeam emitter array with respect to the light valve array, e.g., by the offset distance Δ, as illustrated. In some embodiments, the first row I of multibeam emitters 130 and the second row II of multibeam emitters 130 may be adjacent to one another.

Figure 3:
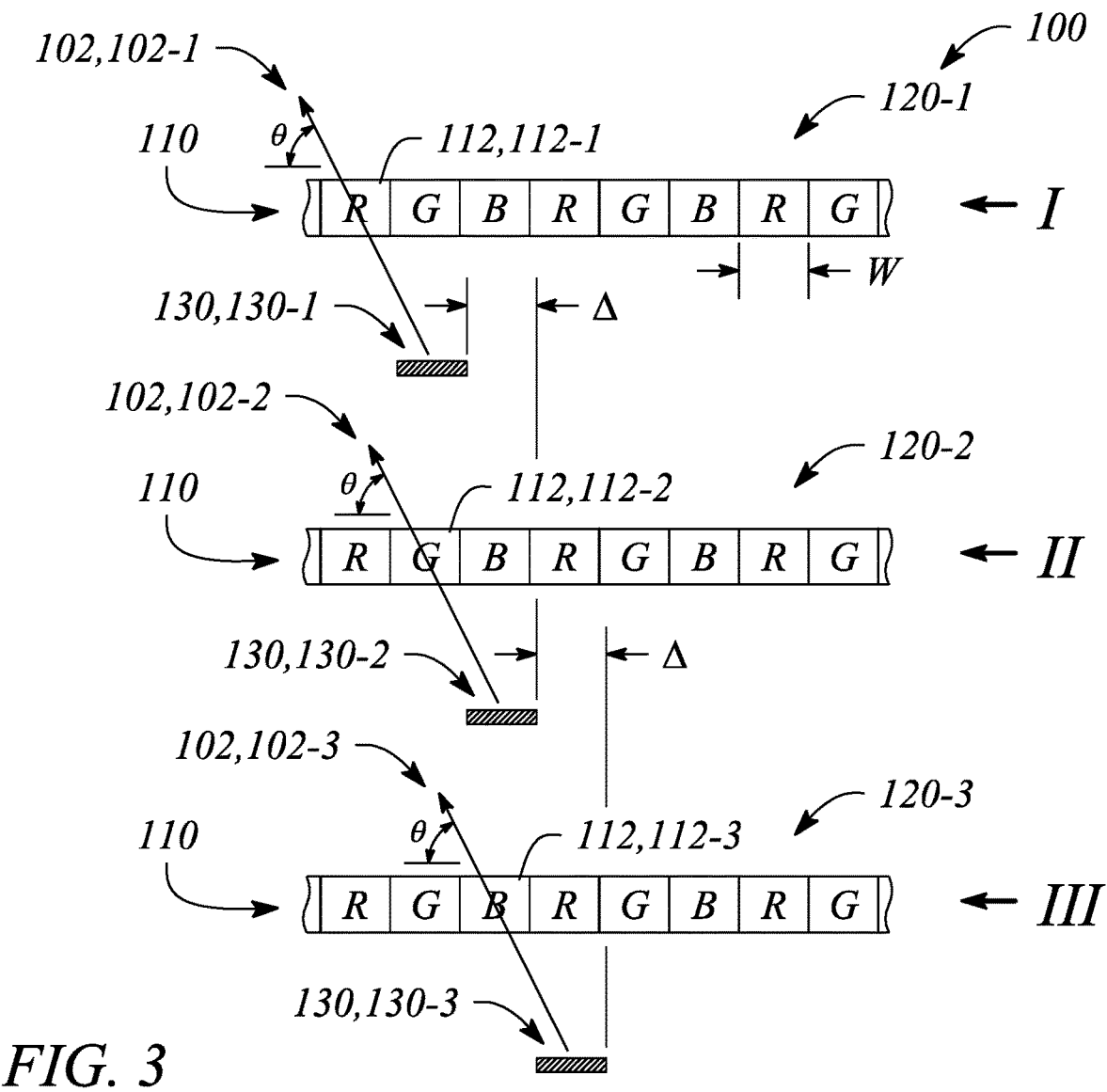
FIG. 3 illustrates cross-sectional views of portions of a multiview display in an example, according to an embodiment consistent with the principles described herein.

According to various embodiments, the offset or offset distance Δ is configured to direct to a color pixel of the multiview image a modulated directional light beam from each of the first multibeam emitter and the second multibeam emitter having an equivalent angular direction relative to one another. FIG. 3 illustrates a cross-sectional view of a portion of a multiview display 100 in an example, according to an embodiment consistent with the principles described herein. In particular, the portion of the multiview display 100 illustrated in FIG. 3 includes a portion of the array of light valves 110 as well as portions of the three different multiview pixels 120-1, 120-2, and 120-3 within the light valve array. Further, the three different multiview pixels 120-1, 120-2, and 120-3 correspond to three different multibeam emitters 130-1, 130-2, and 130-3 (e.g., corresponding to the first and second multibeam emitters 130-1, 130-2, plus a third multibeam emitter 130-3). As illustrated, the three different multibeam emitters 130-1, 130-2, and 130-3 may be in three adjacent rows I, II, III of the multibeam emitter array, for example. In FIG. 3, the three different multibeam emitters 130-1, 130-2, and 130-3 are depicted offset from one another by the offset or offset distance Δ. The illustrated offset or offset distance Δ is equal to a width W of a color sub-pixel 112. FIG. 3 also illustrates each of the light valves 110 of the light valve array as having a repeating plurality of color sub-pixels 112.

In FIG. 3, for each of the three different multibeam emitters 130-1, 130-2, and 130-3, a directional light beam 102 emitted by individual ones of the multibeam emitters 130-1, 130-2, and 130-3 is modulated by a light valve 110 or more particularly by a corresponding to a color sub-pixel 112 of the light valve 110. The depicted directional light beams 102 have the same angular direction denoted by the elevation angle θ, as illustrated. However, because of the offset between the multibeam emitters, the light beams are modulated by color sub-pixels 112 having different colors. In particular, in FIG. 3 a first directional light beam 102-1 is modulated by a red (R) color sub-pixel 112-1, a second directional light beam 102-2 is modulated by a green (G) color sub-pixel 112-2, and a third directional light beam 102-3 is modulated by a blue color sub-pixel 112-3, as illustrated. As such, the offset distance Δ of the offset is configured to direct to a color pixel of the multiview image the modulated directional light beams 102-1, 102-2, and 102-3, each having the same angular directions θ.

The modulated directional light beams 102 from the first, second, and third multibeam emitters 130-1, 130-2, and 130-3 represent the respective different colors within the color pixel of the multiview image. Accordingly, the directional light beam 102-1 has a red color, the directional light beam 102-2 has a green color, and the directional light beam 102-3 has a blue color, each color of a directional light beam 102 corresponding to a color of the color sub-pixel 112 of the light valve 110 that modulated the directional light beam 102.

According to various embodiments, the equivalent angular directions θ of the directional light beams 102 are configured to mitigate color fringing associated with the color pixel of the multiview image. In particular, the equivalent angular directions θ of the directional light beams minimize uneven overlap between directional light beams 102 of different colors that can emphasize certain colors in a color pixel of the multiview image over other color pixels depending on a direction at with the multiview image is viewed. For example, in a color pixel where all three different color sub-pixels 112-1, 112-2, 112-3 are active to produce a white color pixel in the multiview image, the equivalent angular directions θ ensure that the differently colored, directional light beams 102-1, 102-2, and 102-3 modulated by the different color sub-pixels 112-1, 112-2, 112-3 blend together evenly to produce white light.

A different subset of color sub-pixels 112 of the repeating plurality of color sub-pixels of the light valve array corresponds to each multibeam emitter 130 of the multibeam emitter array. Further, each of the different subset represents a multiview pixel 120 of the multiview display. Accordingly, a relationship between the multibeam emitters 130 of the multibeam emitter array and corresponding multiview pixels 120 (e.g., sets of light valves 110) may be a one-to-one relationship. That is, there may be an equal number of multiview pixels 120 and multibeam emitters 130. FIGS. 2B and 3 explicitly illustrate by way of example the one-to-one relationship where each multiview pixel 120 comprising a different set of light valves 110 is illustrated as surrounded by a thicker line.

Referring again to FIG. 2B, the color sub-pixels 112 of the repeating plurality of color sub-pixels are arranged along rows of the light valve array. For example, the row comprising color sub-pixels 112-1 is aligned with the row of light valves 110 comprising a light valve 110. Further, multibeam emitters 130 of the multibeam emitter array are arranged in rows having a row direction corresponding to a row direction of the rows of the light valve array. Accordingly, the row of multibeam emitters 130 comprising the multibeam emitter 130-1 has the same row direction as the row the light valves 110 comprising the light valves 110, according to some embodiments.

According to various embodiments, the offset distance Δ of the offset between multibeam emitters 130 (e.g., between the first multibeam emitter 130-1 and the second multibeam emitter 130-2) is an integer multiple of a distance between adjacent color sub-pixels 112 (e.g., between the first color sub-pixel 112-1 and the second color sub-pixel 112-1) of the repeating plurality of color sub-pixels 112 in the row direction of the rows (or alternatively in a column direction of the columns). As described above, FIG. 2B illustrates the offset between the first multibeam emitter 130-1 and the second multibeam emitter 130-2 where the offset distance Δ is equal to a width of a color sub-pixel 112, i.e., equal to the distance between adjacent color sub-pixel 112 along the row. In other embodiments, the offset distance Δ of the offset may be equal to twice the width of a color sub-pixel 112, i.e., equal to twice the distance between adjacent color sub-pixels 112 in the row. In yet other embodiments, the offset distance Δ of the offset may be three times, four times, and so on, the width of a color sub-pixel 112, i.e., equal to three time, four times, and so on, the distance between adjacent color sub-pixels 112 in the row.

As described above, the first and second multibeam emitters 130-1, 130-2 are members of different rows of the multibeam emitter array. In other embodiments, both the first multibeam emitter and the second multibeam emitter may be members of a single (i.e., of the same) row or column of the multibeam emitter array. Further, in these embodiments, the offset may be either in a positive direction or a negative direction along the single row or column. That is, the offset may be a positive offset distance Δ or a negative offset distance −Δ along the row or column.

Figure 4A:
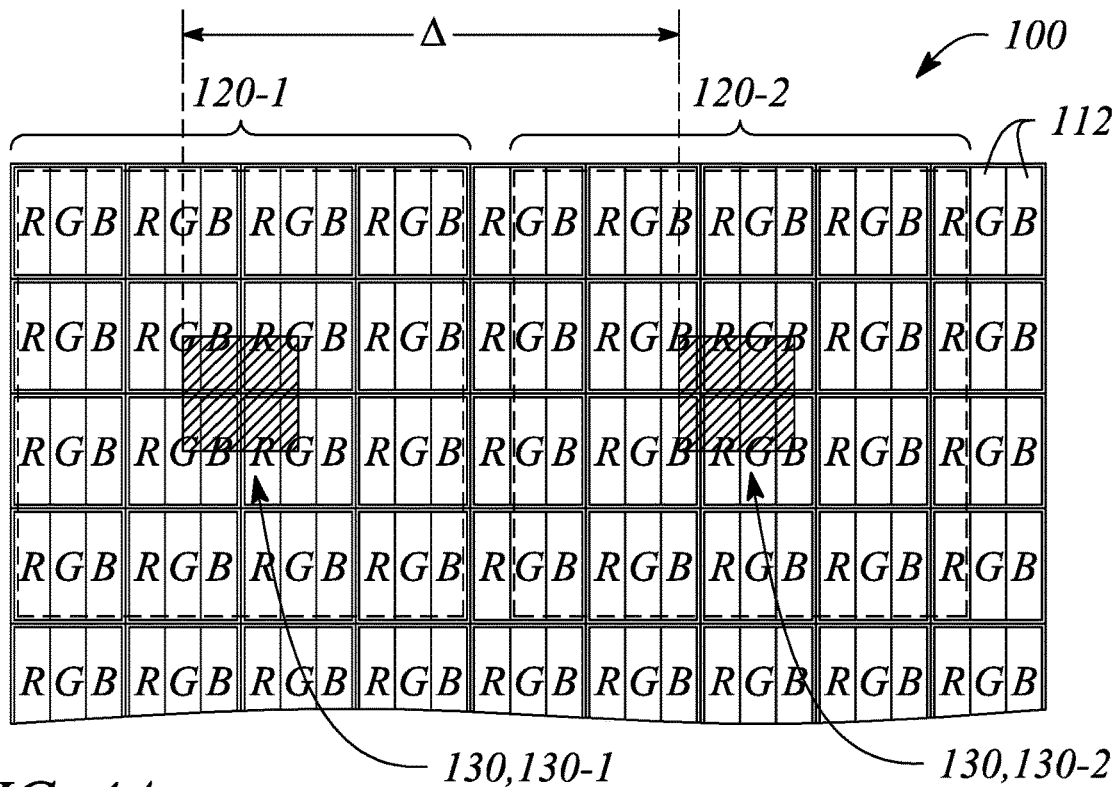
FIG. 4A illustrates a plan view of a portion of a multiview display in an example, according to an embodiment consistent with the principles described herein.

FIG. 4A illustrates a plan view of a portion of a multiview display 100 in an example, according to an embodiment consistent with the principles described herein. In particular, the multiview display 100 illustrated in FIG. 4A comprises an array of light valves 110 having a repeating plurality of red (R), green (G), and blue (B) color sub-pixels 112 configured to modulate directional light beams as color pixels of a multiview image. Further, as illustrated, the multiview display 100 further comprises an array of multibeam emitters 130 comprising a first multibeam emitter 130-1 and a second multibeam emitter 130-2, offset from one another with respect to the light valve array. As with the multiview display 100 of FIGS. 2B-2C, the color sub-pixels 112 of the repeating plurality of color sub-pixels are arranged along rows of the light valve array and the multibeam emitters 130 of the multibeam emitter array are arranged in rows having a row direction corresponding to a row direction of the rows of the light valve array.

As illustrated in FIG. 4A, the first multibeam emitter 130-1 and the second multibeam emitter 130-2 are offset from one another with respect to the light valve array by the positive offset distance Δ. But unlike the multiview display 100 of FIG. 2B, the first multibeam emitter 130-1 and the second multibeam emitter 130-2 are on the same row of multibeam emitters 130. Because a different subset of color sub-pixels 112 or, equivalently, a multiview pixel 120, corresponds to each multibeam emitter 130, the first multiview pixel 120-1 and the second multiview pixel 120-2 respectively corresponding to the first multibeam emitter 130-1 and the second multibeam emitter 130-2 are also offset from one another with respect to the light valve array and along the same row, as illustrated.

The positive offset distance Δ, illustrated in FIG. 4A, between the first multibeam emitter 130-1 and the second multibeam emitter 130-2 is equal to a color sub-pixel width W, which represents a distance between color sub-pixels, as previously described, plus a width of a multiview pixel 120. That is, the second multibeam emitter 130-2 along with the second multiview pixel 120-2 are both shifted in a positive offset direction Δ, relative to a location without a shift. Accordingly, the corresponding first and second multiview pixels 120-1, 120-2 are separated by a column of color sub-pixels 112, being members of the same row of multiview pixels 120. As above, the positive offset distance Δ may be equal to two color sub-pixels widths or three color sub-pixel widths, and so on, according to some embodiments. Also, as above, the offset is configured to mitigate color fringing associated with the color pixels of the multiview image.

Figure 4B:
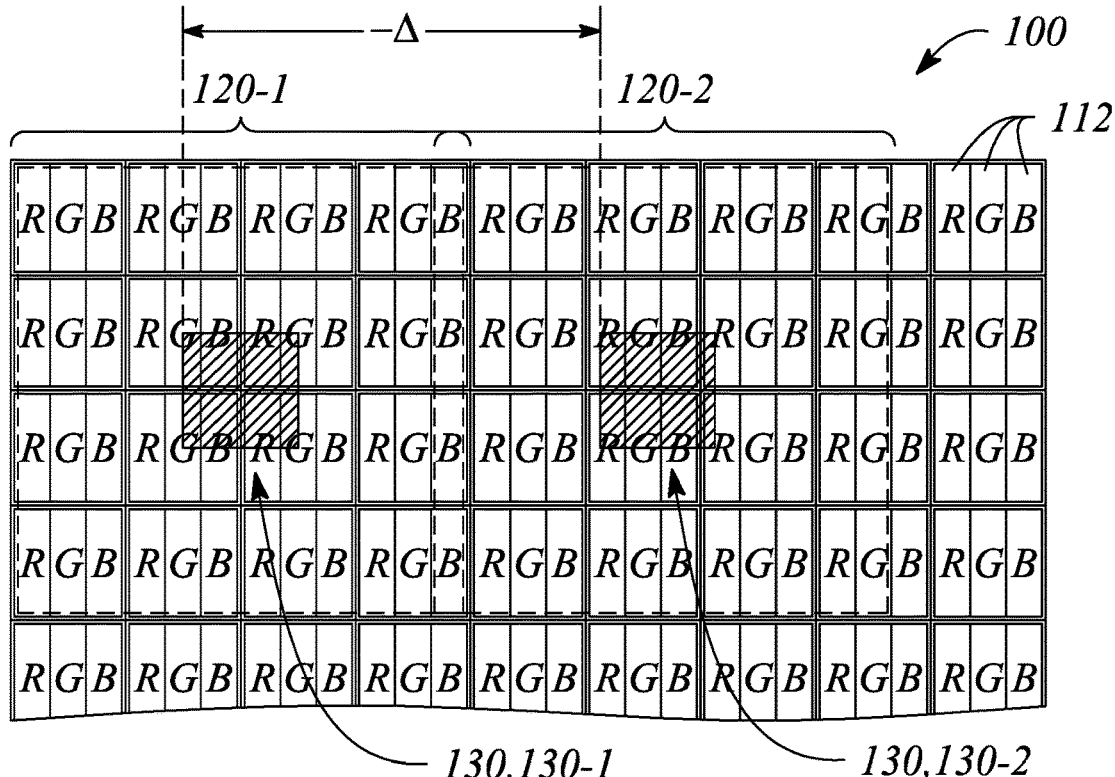
FIG. 4B illustrates a plan view of a portion of a multiview display in another example, according to an embodiment consistent with the principles described herein.

FIG. 4B illustrates plan view of a portion of a multiview display 100 in another example, according to an embodiment consistent with the principles described herein. Here, as in FIG. 4A, the offset exists between the first and second multibeam emitters 130-1, 130-2 (and therefore multiview pixels 120-1, 120-2) on the same row of multibeam emitters 130. However, the first and second multibeam emitters 130-1, 130-2 are offset toward each other on the same row, unlike in FIG. 4A where they were offset away from each other. Thus, the offset has a negative offset distance −Δ between the first and second multibeam emitters 130-1, 130-2, but still remains an integer multiple of a distance between a first color sub-pixel 112 and a second color sub-pixel 112 of the repeating plurality of color sub-pixels 112.

Figure 5A:
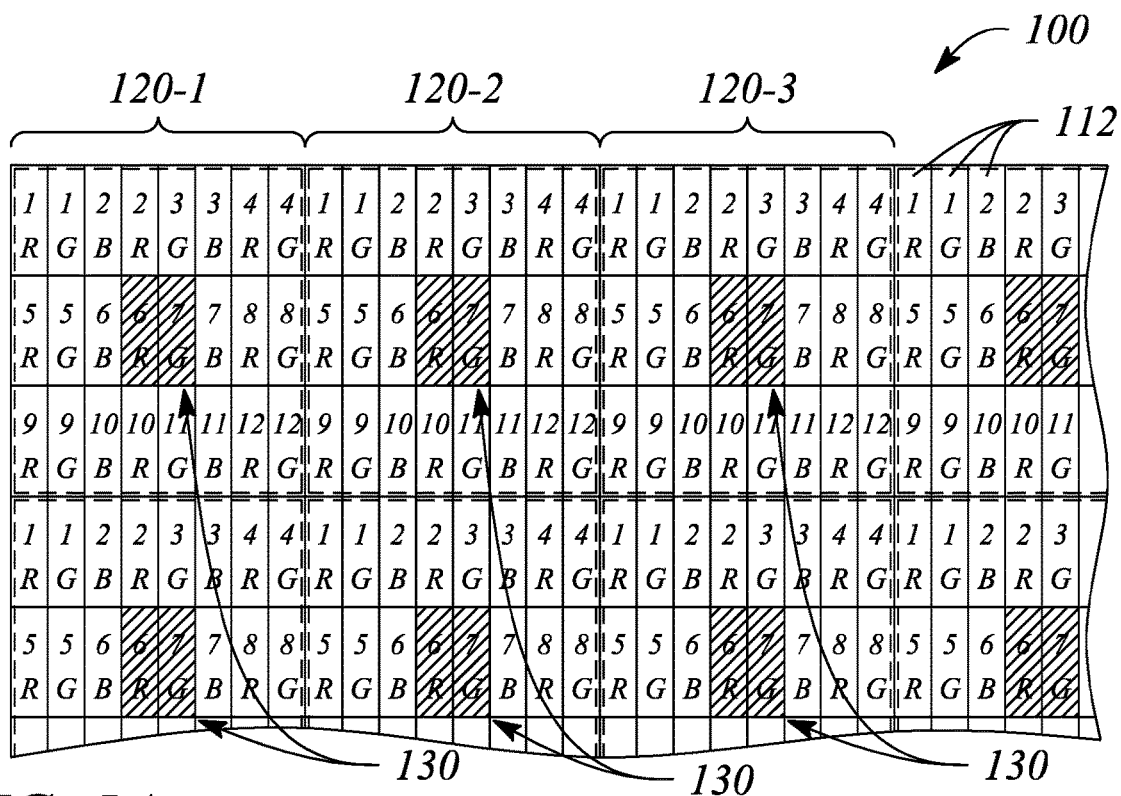
FIG. 5A illustrates a plan view of a portion of a multiview display in another example, according to an embodiment consistent with the principles described herein.
Figure 5B:
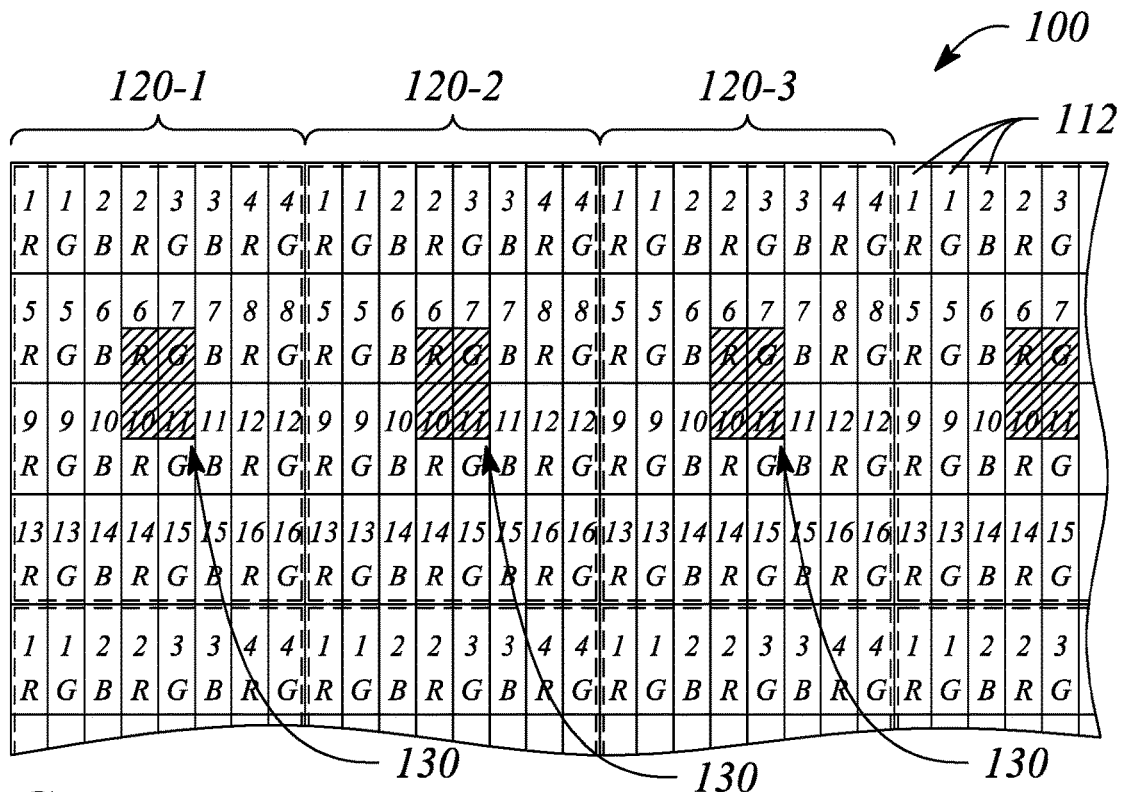
FIG. 5B illustrates a plan view of a portion of a multiview display in yet another example, according to an embodiment consistent with the principles described herein.

FIG. 5A illustrates a plan view of a portion of a multiview display 100 in another example, according to an embodiment consistent with the principles described herein. FIG. 5B illustrates a plan view of a portion of a multiview display 100 in yet another example, according to an embodiment consistent with the principles described herein. As illustrated in FIG. 5A, the multiview display 100 is a 4×3 display (i.e., offers 12 views in full parallax mode), while the multiview display 100 illustrated in FIG. 5B is a 4×4 display (i.e., offers 16 views in full parallax mode) by way of example and not limitation. Further, the illustrated multiview display 100 of FIGS. 5A and 5B comprise the repeating plurality of color sub-pixels 112 configured to modulate directional light beams as color pixels, as well as the array of multibeam emitters 130 configured to provide the directional light beams. The repeating plurality of color sub-pixels 112 comprises a red (R) color sub-pixel 112, a green (G) color sub-pixel 112, and a blue (B) color sub-pixel 112. However, unlike the multiview display 100 of FIGS. 2B and 4A-4B, two color sub-pixels 112 for a given view (i.e., labeled '1', '2', '3', etc., respectively for views 1, 2, 3, etc.) are included in each of the multiview pixels 120. For example, a first view (view 1) of a first multiview pixel 120-1 may comprise the red (R) color sub-pixel 112 and an adjacent green (G) color sub-pixel 112. Also for the first view (view 1), a second multiview pixel 120-2 may comprise a blue (B) color sub-pixel 112 and a red (R) color sub-pixel 112, while a third multiview pixel 120-3 may comprise a green (G) color sub-pixel 112 and a blue (B) color sub-pixel 112. Together the first, second, and third multiview pixels 120-1, 120-2, 120-3 combine to provide each of a red, green, and blue modulated directional light beam to the first view (view 1) of the multiview image. Moreover, since the multibeam emitters 130 corresponding to each of the first, second, and third multiview pixels 120-1, 120-2, 120-3 are offset from one another relative to the light valve array, the modulated directional light beams provided to the first view (view 1) each have an equivalent angular direction relative to one another, thus mitigating color fringing.

Referring back to FIG. 2A, in some embodiments, the multiview display 100 may further comprises a light guide 140, e.g., as illustrated. The light guide 140 is configured to guide light along a length of the light guide as guided light 104 (i.e., a guided light beam 104). For example, the light guide 140 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 140, for example.

In some embodiments, the light guide 140 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 140 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 140 may further include a cladding layer (not illustrated) on at least a portion of a surface (e.g., one or both of the first surface and the second surface) of the light guide 140. The cladding layer may be used to further facilitate total internal reflection, according to some examples.

Further, according to some embodiments, the light guide 140 is configured to guide the guided light 104 according to total internal reflection at a non-zero propagation angle between a first surface 140' (e.g., front or top surface or side) and a second surface 140" (e.g., back or bottom surface or side) of the light guide 140. In particular, the guided light 104 propagates by reflecting or 'bouncing' between the first surface 140' and the second surface 140" of the light guide 140 at the non-zero propagation angle. In some embodiments, a plurality of guided light beams 104 comprising different colors of light may be guided by the light guide 140 at respective ones of different color-specific, non-zero propagation angles. Note, the non-zero propagation angle is not illustrated in FIG. 2A for simplicity of illustration. However, a bold arrow depicting a propagation direction 103 illustrates a general propagation direction of the guided light 104 along the light guide length in FIG. 2A.

According to some embodiments, the multibeam emitters 130 of the array may be located at or adjacent to the first surface 140' of the light guide 140, for example, as illustrated in FIG. 2A. In other embodiments (not illustrated), the plurality of multibeam emitters 140 may be located on a second surface 140" of the light guide 140. In yet other embodiments (not illustrated), the multibeam emitters 130 of the plurality may be located inside the light guide 140 between the first surface 140' and the second surface 140". Further, in yet other embodiments (not illustrated), the light guide 140 may be replaced by another substrate (e.g., a non light guide substrate).

In some embodiments (e.g., that employ the light guide 140 as in FIG. 2A), the multibeam emitter 130 of the multiview display 100 may comprise a multibeam element. The multibeam element of the multiview display 100 is configured to scatter out light from the light guide 140 as a plurality of directional light beams having principal angular directions corresponding to view directions of the multiview image. According to various embodiments, the multibeam element may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

Further in embodiments that employ the light guide 140, the multiview display 100 may further comprise a light source 150 configured to provide the light to be guided within light guide 140. In particular, the light source 150 may be located adjacent to an entrance surface or end (input end) of the light guide 140. In various embodiments, the light source 150 may comprise substantially any source of light (e.g., optical emitter) including, but not limited to, one or more light emitting diodes (LEDs) or a laser (e.g., laser diode). In some embodiments, the light source 150 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 150 may be a substantially broadband light source configured to provide substantially broadband or polychromatic light. For example, the light source 150 may provide white light. In some embodiments, the light source 150 may comprise a plurality of different optical emitters configured to provide different colors of light. The different optical emitters may be configured to provide light having different, color-specific, non-zero propagation angles of the guided light corresponding to each of the different colors of light.

In some embodiments, the guided light 104 may be collimated or equivalently may be a collimated light beam (e.g., provided by a collimator, as described below). Herein, a 'collimated light' or 'collimated light beam' is generally defined as a beam of light in which rays of the light beam are substantially confined to a predetermined or defined angular spread within the light beam (e.g., the guided light 104). Further, rays of light that diverge or are scattered from the collimated light beam are not considered to be part of the collimated light beam, by definition herein. Moreover, the guided light 104 may be collimated according to or having a collimation factor σ, in various embodiments.

In other embodiments (not illustrated), the multibeam emitters 130 may comprise an active emitter such as, but not limited to, a micro light emitting diode and a micro organic light emitting diode. In these embodiments, the light guide and light source may be omitted. Instead, the light guide 140 may be replaced by a substrate to support and provide power to the multibeam emitters 130, as mentioned above.

Figure 6:
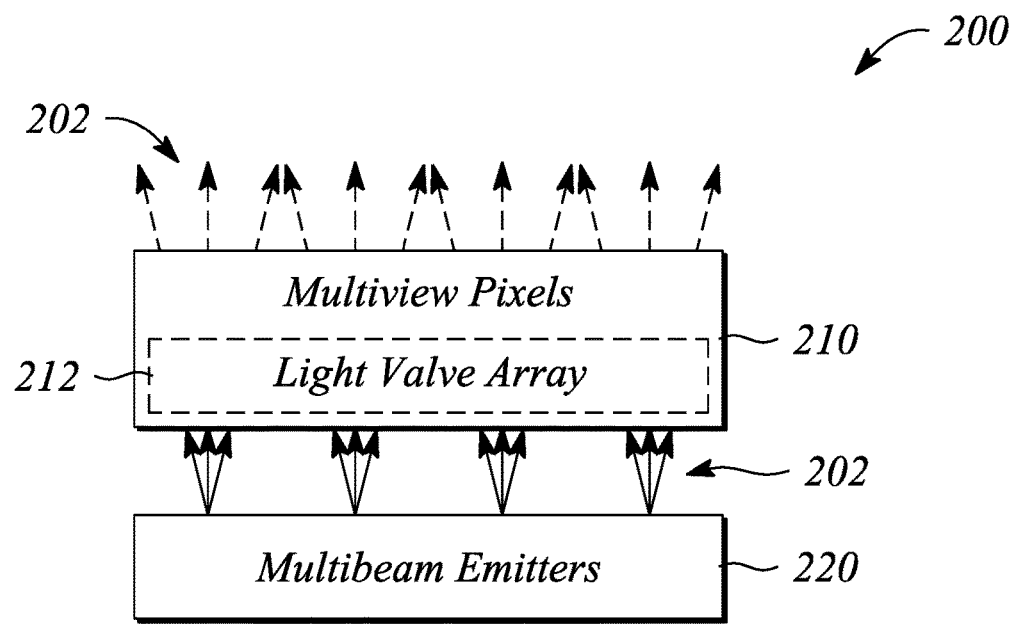
FIG. 6 illustrates a block diagram of a multiview display, according to an embodiment consistent with the principles described herein.

According to some embodiments of the principles described herein, a multiview display 200 is provided. FIG. 6 illustrates a block diagram of a multiview display 200, according to an embodiment consistent with the principles described herein. The multiview display 200 illustrated in FIG. 6 comprises an array of multiview pixels 210 comprising light valves 212 having a plurality of color sub-pixels. Multiview pixels 210 of the multiview pixel array may be arranged in rows and columns of multiview pixels 210, according to various embodiments. In the array of multiview pixels 210, a first multiview pixel 210 may correspond to a color sub-pixel of a first color and a second multiview pixel 210 may correspond to a color sub-pixel of a second color. For example, the first multiview pixel 210 may correspond to a color sub-pixel having a red (R) color, or a 'red' color sub-pixel. Similarly, a second multiview pixel 210 may correspond to a color sub-pixel having a green (G) color, or a 'green' color sub-pixel. In some embodiments, a third multiview pixel 210 may correspond to a color sub-pixel of a third color, e.g., a color sub-pixel having a blue (B) color, or a 'blue' color sub-pixel.

The multiview pixels 210 as well as the light valves 212 of the multiview pixels 210 and corresponding color sub-pixels thereof may be substantially similar respectively to the multiview pixels 120, the light valves 110 and color sub-pixels 112 described above with respect to the multiview display 100. As such, different types of light valves may be employed as the light valves 212 of the multiview display 200 including, but not limited to, one or more of liquid crystal light valves, electrophoretic light valves, and light valves based on electrowetting. Moreover, the light valves 212 may include any of a number of different combinations of color sub-pixels including, but not limited to, red (R), green (G), and blue (B) color sub-pixels of an RGB color model.

The multiview display illustrated in FIG. 6 further comprises an array of multibeam emitter 220. In some embodiments, a multibeam emitter 220 of the multibeam emitter array may be substantially similar to the multibeam emitter 130 of the multiview display 100, described above. According to various embodiments, multibeam emitters 220 of the multibeam emitter array are configured to illuminate the multiview pixels 210 with directional light beams 202 having angular directions corresponding to the respective views directions of the multiview display 200 or equivalently to view directions of a multiview image displayed using the multiview display 200. According to various embodiments, each multibeam emitter of the multibeam emitter array is configured to illuminate a different multiview pixel 210 of the multiview display 200. As such, there is a one-to-one relationship between a multibeam emitter 220 of the array of multibeam emitters 220 and a multiview pixel 210 of the array of multiview pixels 210.

According to various embodiments, a differential offset between the first and second multiview pixels 210 is configured to provide to a color pixel of a multiview image a pair of directional light beams 202 having both different colors and comparable angular directions relative to one another. For example, a pair of such directional light beams 202 of a multiview display 200 may be substantially similar to the directional light beams 102-1, 102-2, as illustrated in FIG. 3 with respect to the multiview display 100.

In various embodiments, the first and second multiview pixels 210 may be offset with respect to an array of the light valves 212. In particular, the offset may be in a row direction of the light valve array or the column direction of the light valve array. In some embodiments, the first multiview pixel 210 may be in the first row of the multiview pixel array, whereas the second multiview pixel 210 may be in the second row of the multiview pixel array, the second row being adjacent to the first. In such embodiments, the first row of the multiview pixel array may be offset in relation to the second row of the multiview pixel array.

In some embodiments, the differential offset between the first multiview pixel 210 and the second multiview pixel 210 of the multiview pixel array is an integer multiple of a distance between a first color sub-pixel and a second color sub-pixel of the plurality of color sub-pixels. For example, the differential offset may be equivalent to a width of a color sub-pixel. In some embodiments, the differential offset may be equal to twice the width of a color sub-pixel. In some embodiments, the differential offset may be three times the width of a color sub-pixel, for example. The differential offset between the first multiview pixel 210 and the second multiview pixel 210 is configured to mitigate color fringing associated with the color pixel of the multiview image, according to various embodiments.

Further, as a result of the one-to-one relationship between a multiview pixel 210 of the multiview pixel array and a multibeam emitter 220 of the multibeam emitter array, the differential offset between the first multiview pixel 210 and the second multiview pixel 210 may be mirrored in a differential offset between a first multibeam emitter 220 and a second multibeam emitter 220. For example, in embodiments where the first multiview pixel 210 is in a first row of multiview pixels 210 and the second multiview pixel 210 is in a second and adjacent row of multiview pixels 210, a corresponding first row of multibeam emitters 220 may be offset from a corresponding second and adjacent row of multibeam emitters 220.

In some embodiments, the first multiview pixel 210 and the second multiview pixel 210 are both member of a single or the same row of the multiview pixel array. In such embodiments, the differential offset exists may exist along the single row of multiview pixels 210. Further, the differential offset may be either in a positive direction or a negative direction along the row. Where the differential offset exists in a positive direction, the first and second multiview pixels 210 may be separated by at least one color sub-pixel of the plurality of color sub-pixels. In a negative direction, the first and second multiview pixels 210 may overlap by the distance of the offset, e.g., a width of a color sub-pixel.

In some embodiments, the multiview display 200 further comprises a light guide. The light guide configured to guide light in a propagation direction along a length of the light guide. The light guide may be substantially similar to the light guide 140 of the multiview display 100, previously described. According to various embodiments, the light guide may be configured to guide the guided light using total internal reflection. Further, the guided light may be guided at a non-zero propagation angle by or within the light guide. In some embodiments, the guided light may be collimated or may be a collimated light beam. In particular, the guided light may be collimated according to or having a collimation factor σ, in various embodiments.

The multiview display 200 may further comprise an array of multibeam elements spaced apart from one another along the light guide length. In some embodiments, the multibeam elements of the array are substantially similar to the multibeam elements of the above-described multiview display 100. Further, a multibeam element of the multibeam element array may correspond to a multibeam emitter 220 of the multibeam emitter array. In particular, a multibeam emitter 220 of the multibeam emitter array may comprise a multibeam element of the multibeam element array. According to various embodiments, the multibeam elements are configured to scatter out a portion of the guided light as directional light beams 202 associated with multiview pixels 210 of the multiview display 200. The directional light beams have principal angular directions corresponding to respective different view directions of the multiview display 200.

The multibeam elements of the multibeam element array may be located on surface of or within the light guide, according to various embodiments. Further, a size of the multibeam element of the multibeam element array is comparable to a size of a light valve 212 of the multiview pixel array, according to various embodiments. In some embodiments, the size of the multibeam emitter is comparable to the light valve size such that the multibeam element size is between about fifty percent (50%) and about two hundred percent (200%) of the light valve size. In addition, a shape of multibeam elements may be comparable to a shape of the multiview pixels 210. For example, the multibeam element may have a square shape and the multiview pixel 210 may be substantially square. In another example, the multibeam element may have a rectangular shape, i.e., may have a length or longitudinal dimension that is greater than a width or transverse dimension, and the multiview pixel 210 may be substantially rectangular. In some embodiments, a distance between adjacent multibeam elements in the multibeam element array may be commensurate with a distance between adjacent multiview pixels 210 of the multiview display 200. For example, an inter-element distance (e.g., center-to-center distance) between a pair of adjacent multibeam elements of the multibeam element array may be equal to an inter-pixel distance (e.g., a center-to-center distance) between a corresponding adjacent pair of multiview pixels 210.

In some embodiments, the multibeam elements of the array may comprise any of a number of different structures configured to scatter out a portion of the guided light. For example, the different structures may include, but are not limited to, diffraction gratings, micro-reflective elements, micro-refractive elements, or various combinations thereof. In some embodiments, the multibeam element comprising a diffraction grating is configured to diffractively scatter out the guided light portion as the plurality of directional light beams having the different principal angular directions. In other embodiments, the multibeam element comprising a micro-reflective element is configured to reflectively scatter out the guided light portion as the plurality of directional light beams, or the multibeam element comprising a micro-refractive element is configured to scatter out the guided light portion as the plurality of directional light beams by or using refraction (i.e., refractively scatter out the guided light portion).

In other embodiments, the multibeam emitter of the multibeam emitter array comprises an active optical emitter configured to emit light as the directional light beams. The active optical emitter is configured to produce or generate light that is not received from another source of light when activated or turned on. The active optical emitter may comprise a light emitting diode (LED), a micro light emitting diode (µLED), or an organic light emitting diode (OLED), in some examples. As with the multibeam element previously described, one or more of the active optical emitters may have a size comparable to a size of a light valve of the multiview pixel array.

Figure 7:
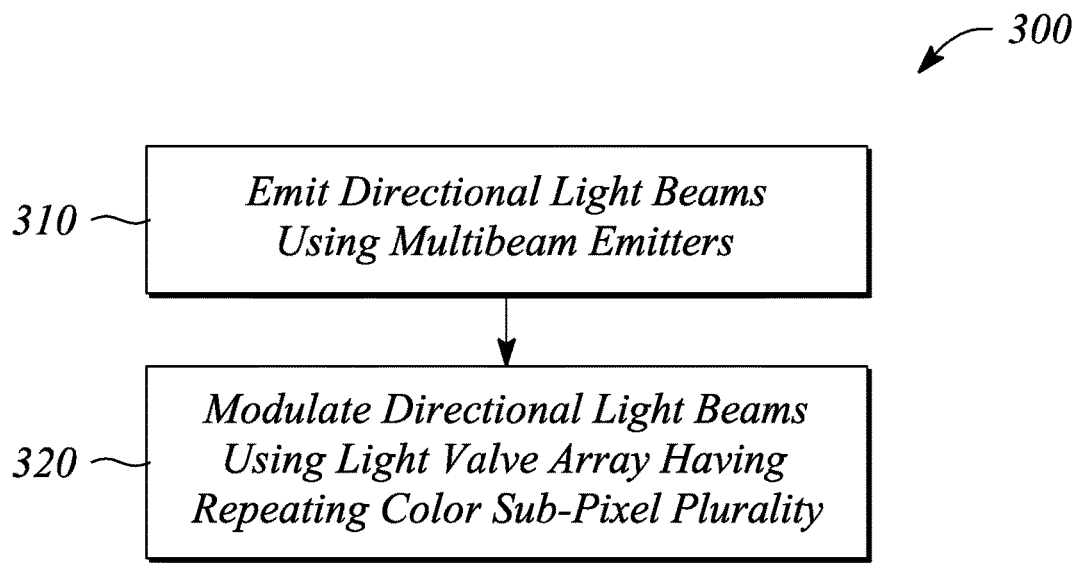
FIG. 7 illustrates a flow chart of the method of multiview display operation, according to an embodiment consistent with the principles described herein.

According to some embodiments of the principles described herein, a method of multiview display operation 300 is provided. FIG. 7 illustrates a flow chart of the method of multiview display operation 300, according to an embodiment consistent with the principles described herein. The method comprises emitting 310 directional light beams using an array of multibeam emitters. In some embodiments, the multibeam emitters of the array may be substantially similar to the multibeam emitters 130 of multiview display 100, previously described. In particular, the multibeam emitters of the array may be arranged in rows and columns of multibeam emitters and additionally the directional light beams have directions corresponding to different views directions of the multiview display or equivalently of a multiview image displayed thereon. According to various embodiments, a first multibeam emitter and a second multibeam emitter of the multibeam emitter array are offset from one another. The offset between the first and the second multibeam emitter may be along a row direction of the multibeam emitter array. In other embodiments, the offset may be along a column direction of the multibeam emitter array, according to some embodiments.

The method of multiview display operation 300 further comprises modulating 320 the directional light beams using an array of light valves having a repeating plurality of color sub-pixels. According to various embodiments, modulating 320 the directional light beams provides color pixels of views of a multiview image, e.g., the multiview image displayed by the multiview display. In some embodiments, the array of light valves may be substantially similar to the array of light valves 110 of the above-described multiview display 100. As such, different types of light valves may be employed as the light valves of the light valve array including, but not limited to, one or more of liquid crystal light valves, electrophoretic light valves, and light valves based on electrowetting, as was previously described. Further, the color sub-pixels of the repeating plurality of color sub-pixels may be arranged along rows (or along columns) of the light valve array. Herein, by definition, the row direction along which the multibeam emitters of the multibeam emitter array may be offset corresponds to a row direction of rows of light valves of the light valve array. Similarly the column direction along which the multibeam emitters may be offset corresponds to a column direction of columns of light valves of the light valve array, by definition.

According to some embodiments, each color sub-pixel of the repeating plurality of color sub-pixels may have a different color. For example, the repeating plurality of color sub-pixels may consists of a repeating set of red (R), green (G), and blue (B) color sub-pixels (e.g., consistent with an RGB color model) in this order along a row light valves of the array of light valves. In other embodiments, the repeating plurality of color sub-pixels may comprise another repeating set of color sub-pixels including, but not limited to a repeating set of red (R), green (G), blue (B), and yellow (Y) color sub-pixels, a repeating set of red (R), green (G), blue (B), and white (W) color sub-pixels, and a repeating set of cyan (C), yellow (Y), magenta (M), and black (K) color sub-pixels.

In various embodiments, the offset directs to a color pixel of the multiview image a modulated directional light beam from each of the first multibeam emitter and the second multibeam emitter having equivalent angular directions. Likewise, the offset may direct to a color pixel of the multiview image a modulate directional light beam from a third multibeam emitter that also has an angular direction equivalent to that of the angular direction corresponding to directional light beams from the first and second multibeam emitters. The offset between the first multibeam emitter and the second multibeam emitter (or between the first second and third multibeam emitter) is configured to mitigate color fringing within the color pixel. In particular, color fringing may be mitigated by minimizing uneven overlap between light beams of different color that can emphasize certain colors in a pixel over adjacent colors based on a particular viewpoint.

In some embodiments, the offset between the first multibeam emitter and the second multibeam emitter of the multibeam emitter array is an integer multiple of a distance between a first color sub-pixel and a second color sub-pixel of the repeating plurality of color sub-pixels in the row direction of the rows. For example, the offset between the first multibeam emitter and the second multibeam emitter of the multibeam emitter array may be a width of a single color sub-pixel. In another example, the offset may be two, three, or more color sub-pixel widths, for example.

In some embodiments, the first multibeam emitter and the second multibeam emitter of the multibeam emitter array are both members of a single row of the multibeam emitter array. In such embodiments, the offset between the first multibeam emitter and the second multibeam emitter may exist along the single row of the multibeam emitter array. Further, the offset may be either in a positive direction or a negative direction. Where the offset exists in a positive direction, the first and second multibeam emitters may be separated by at least one color sub-pixel of the plurality of color sub-pixels. In a negative direction, the first and second multibeam emitters may overlap by the distance of the offset.

In some embodiments, emitting 310 directional light beams using an array of multibeam emitters comprises guiding light in a light guide as guided light. The light guide may be substantially similar to the light guide 140 of the multiview display 100 described above, according to some embodiments. In some embodiments, the light may be guided at a non-zero propagation angle between opposite internal surfaces of the light guide.

In some embodiments, emitting 310 the directional light beams using the array of multibeam emitters further comprises scattering out a portion of the guided light using a multibeam element of an array of multibeam elements to provide the directional light beams. In these embodiments, the multibeam element array is the multibeam emitter array and each multibeam element of the multibeam element array corresponds to a different multibeam emitter of the multibeam emitter array. According to some embodiments, the multibeam element of the multibeam element array may be substantially similar to the multibeam element 130 of the multiview display 100, as described above. Further, the multibeam element (or the multibeam emitter, for that matter) may have a size comparable to a size of a light valve of the light valve array. For example, the size of the multibeam element may be comparable to the light valve size such that the multibeam element size is between about fifty percent (50%) and about two hundred percent (200%) of the light valve size.

Thus, there have been described examples and embodiments of a multiview display comprising an array of light valves having a repeating plurality of color sub-pixels and an array of multibeam emitters offset from one another to mitigate color fringing. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview display comprising:
   an array of light valves having a repeating plurality of color sub-pixels configured to modulate directional light beams as color pixels of views of a multiview image; and
   an array of multibeam emitters configured to provide the directional light beams,
      each color pixel being located at a respective pixel location on the array of light valves,
      a first color pixel of the color pixels including first and second color sub-pixels of the repeating plurality of color sub-pixels,
      the first color sub-pixel configured to modulate a first directional light beam from a first multibeam emitter of the array of multibeam emitters,
      the second color sub-pixel configured to modulate a second directional light beam from a second multibeam emitter of the array of multibeam emitters,
      the first directional light beam and the second directional light beam being parallel,
      the first multibeam emitter being offset by a first offset value with respect to a nearest pixel location on the array of light valves,
      the second multibeam emitter being offset by a second offset value with respect to a nearest pixel location on the array of light valves,
      the first offset value and the second offset value being different.

2. The multiview display of claim 1, wherein a different subset of color sub-pixels of the repeating plurality of color sub-pixels of the light valve array corresponds to each multibeam emitter of the multibeam emitter array, the different subset representing a multiview pixel.

3. The multiview display of claim 1, wherein:
   each color sub-pixel of the repeating plurality of color sub-pixels has a different color;
   the modulated directional light beams from the first and second multibeam emitters represent the respective different colors within the color pixel of the multiview image; and
   the parallelism of the first directional light beam and the second directional light beam mitigates color fringing associated with the first color pixel.

4. The multiview display of claim 1, wherein:
   color sub-pixels of the repeating plurality of color sub-pixels are arranged along rows of the light valve array;
   multibeam emitters of the multibeam emitter array are arranged in rows having a row direction corresponding to a row direction of the rows of the light valve array; and
   the first offset value and the second offset value differing by an integer multiple of a distance between a first color sub-pixel and a second color sub-pixel of the repeating plurality of color sub-pixels in the row direction of the rows.

5. The multiview display of claim 4, wherein:
   the first multibeam emitter is a member of a first row of the multibeam emitter array;
   the second multibeam emitter is member of a second row of the multibeam emitter array;
   the first and second rows are adjacent to one another; and
   the first offset value and the second offset value are offset between the adjacent first and second rows of the multibeam emitter array.

6. The multiview display of claim 4, wherein:
the first multibeam emitter and the second multibeam emitter are both members of a single row of the multibeam emitter array; and
the first offset value and the second offset value are offset either in a positive direction or a negative direction along the single row.

7. The multiview display of claim 1, wherein:
the first color sub-pixel comprises one of a red color sub-pixel, a green color sub-pixel, or a blue color sub-pixel; and
the second color sub-pixel comprises another of the red color sub-pixel, the green color sub-pixel, or the blue color sub-pixel.

\* \* \* \* \*